United States Patent [19]

Vernaleken et al.

[11] 4,038,252

[45] July 26, 1977

[54] PHASE BOUNDARY PROCESS FOR THE PREPARATION OF AROMATIC POLYCARBONATES USING A CHLORINATED AROMATIC HYDROCARBON AS THE POLYMER SOLVENT

[75] Inventors: Hugo Vernaleken, Krefeld; Uwe Hucks, Duisburg, both of Germany

[73] Assignee: Bayer Aktiengesellschaft, Leverkusen, Germany

[21] Appl. No.: 555,225

[22] Filed: Mar. 4, 1975

[30] Foreign Application Priority Data

Mar. 6, 1974 Germany ............................ 2410716

[51] Int. Cl.$^2$ ............................................. C08G 63/62
[52] U.S. Cl. .............................. 260/47 XA; 260/463
[58] Field of Search ..................................... 260/47 XA

[56] References Cited

U.S. PATENT DOCUMENTS

| | | | |
|---|---|---|---|
| 3,340,229 | 9/1967 | Bostian et al. | 260/47 XA |
| 3,674,740 | 7/1972 | Vernaleken et al. | 260/47 XA |
| 3,763,099 | 10/1973 | Jaquiss | 260/47 XA |
| 3,912,687 | 10/1975 | Haupt et al. | 260/47 XA |

*Primary Examiner*—Wilbert J. Briggs, Sr.
*Attorney, Agent, or Firm*—Gene Harsh; Lawrence S. Pope; Frederick H. Colen

[57] ABSTRACT

The present invention provides a process for the preparation of a polycarbonate by the phase boundary condensation method, by phosgenation of an aqueous alkali metal salt solution of one or more aromatic dihydroxy compounds, in which process an aromatic chlorinated hydrocarbon is used as the solvent and the synthesis of the polycarbonate is carried out in two stages, in the first stage of which the reaction of the alkali metal salt solution of the aromatic dihydroxy compound(s) with phosgene is carried out at an OH concentration of between 0.01 and 0.1% by weight of OH, relative to the aqueous phase, in the presence of 0.1 to 2.5 mol% of trialkylamine, relative to aromatic dihydroxy compound(s), and at a temperature higher than 70° C, with a dwell time of less than 5 minutes, while in the second stage the polycondensation is effected by adjusting the OH concentration to 0.20 to 0.50% by weight of OH, relative to the aqueous phase, optionally with further addition of trialkylamine, at a temperature higher than 80° C and with a dwell time of more than 1 minute.

13 Claims, 2 Drawing Figures

PHASE BOUNDARY PROCESS FOR THE PREPARATION OF AROMATIC POLYCARBONATES USING A CHLORINATED AROMATIC HYDROCARBON AS THE POLYMER SOLVENT

BACKGROUND OF THE INVENTION

A current commercial process for the preparation of aromatic polycarbonates is the phase boundary condensation process. According to this process an aqueous bis-phenolate solution is reacted in phosgene with a suitable solvent for the polycarbonate, optionally in the presence of chain stoppers and with further addition of aqueous alkali metal hydroxide solution.

Solvents recommended for this process are preferably chlorinated hydrocarbons such as, for example, methylene chloride, chloroform, 1,2-dichlorethane and chlorobenzene. While, the use of methylene chloride or 1,2-dichlorethane alone or mixed with other solvents, including, for example, chlorobenzene, presents no special problems, the use of chlorobenzene alone entails great difficulties. These difficulties result from the extremely low solubility of the polycarbonates in chlorobenzene at temperatures below 80°C. Thus, for example, 10% strength polycarbonate solutions (bisphenol A type) in chlorobenzene are stable only at temperatures in excess of about 30°C and 20% strength solutions are only stable at above about 70°C. At the customary reaction temperatures of 25°-30°C, only about 8 g of polycarbonate will dissolve in 100 g of chlorobenzene.

Therefore, if it is desired to use chlorobenzene as the sole solvent in the synthesis of polycarbonate by the phase boundary process, it is necessary to maintain reaction temperatures of or in excess of 70°C.

The use of chlorobenzene is of great interest for various reasons including the following:

1. better chemical stability, in comparison to the aliphatic chlorinated hydrocarbons, towards the alkaline reaction solution, and very good heat stability when isolating the polycarbonates in evaporation extruders at temperatures between 300° and 350°C, so that light colored polycarbonates are obtained;
2. a simpler and more reliable form of recovery from the process effluents, due to the substantially lower solubility and volatility of chlorobenzene resulting in improved ecological and ecomonical performance and;
3. less corrosion when recovering the solvent by distillation in the presence of water.

Though the reasons mentioned suggest the industrial use of chlorobenzene in the preparation of polycarbonates, industrial use has hitherto been prevented by the difficulties which occur during phosgenation at elevated temperatures. It becomes difficult to reproducibly conduct the condensation reaction. Saponification reactions occur with both the phosgene and the oligomeric intermediate products having chlorocarbonic acid ester end groups. The reaction requires increased amounts of phosgene compared to lower temperature phosgenation and it becomes impossible to control the molecular weight distribution of the finished polymer to the degree of precision desired. It is believed that this is because at an elevated reaction temperature the saponification reaction of phosgene or of the chlorocarbonic acid ester groups is greatly favored compared to the propagation reaction which leads to the formation of the carbonate polymer. A consequence is that the bisphenols employed are not incorporated quantitatively into the product.

It is clear that an increased consumption of phosgene, incomplete incorporation of the bisphenols employed and molecular weights which do not have the desired values for the particular grade of product, thus producing waste material - are severe economic and technical disadvantages.

SUMMARY OF THE INVENTION

The subject of the present invention is a process for the preparation of high molecular, aromatic polycarbonates by the phase boundary condensation method, by phosgenation of an aqueous alkali metal salt solution of aromatic dihydroxy compounds, characterized in that aromatic chlorinated hydrocarbons are used as the sole polycarbonate solvents and in that the synthesis of the polycarbonate is carried out in two stages. In the first stage, the reaction with phosgene is carried out at OH concentrations of between about 0.01 and 0.1% by weight of OH, relative to the aqueous phase, in the presence of about 0.1 to 2.5 mol% of trialkylamine, relative to aromatic dihydroxy compound employed, and at temperatures in excess of about 70°C, with dwell times less than about 5 minutes. In the second stage, polycondensation is effected by adjusting the OH concentration to about 0.20 to 0.50% by weight, relative to the aqueous phase, optionally with further addition of trialkylamine, at temperatures of in excess of about 80°C and with dwell times of in excess of about 1 minute.

The process according to the invention permits the preparation of polycondensates of high technical quality, and of particularly light color, in an economical manner.

DETAILED DESCRIPTION OF THE INVENTION

Figure 1:
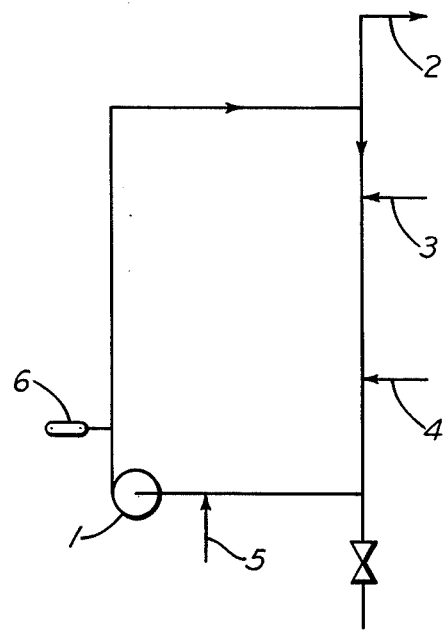

It was found, surprisingly, that the reaction of the phosgene with the aqueous alkali metal salt solution of the aromatic dihydroxy compounds at elevated temperature can be carried out without major loss of phosgene by saponification, so that about 1.05 to 1.20 mols of phosgene suffice per mol of dihydroxy compound if the reaction is carried out at OH concentrations of between about 0.01 and 0.10% by weight in the presence of trialkylamines, using dwell times of less than about 5 minutes.

Any of these three measures (OH concentration, trialkylamine addition at the beginning of the phosgenation and limited dwell time) alone, or in combination of only two of these process parameters, does not suffice for the preparation of high molecular aromatic polycarbonates of technically high quality at the elevated reaction temperatures required when using a chlorinated aromatic hydrocarbon as the sole polycarbonate solvent.

If one of the process parameters is not satisfied the polycarbonates produced will contain an excessive proportion of OH end groups, or the reaction will take place incompletely, so that substantial proportions of the aromatic dihydroxy compounds will remain unreacted in the aqueous phase, or only oligocarbonates will be produced because the saponification reaction of phosgene is favored relative to the polycarbonate formation raction.

The direct addition of the catalyst, trialkylamine, at the beginning of the phosgenation is of particular importance in this context. The general teaching of the art is that the trialkylamines particularly catalyze the formation of polycarbonate from oligocarbonates containing chlorocarbonic acid ester end groups, with elimination of chloride and carbonate, and thus also greatly favor the saponification of phosgene, which is an analogous reaction. Thus, it was particularly surprising that in order to prepare oligocarbonates with chlorocarbonic acid ester end groups, which are converted into high molecular polycarbonates in the second state, it is absolutely essential to add trialkylamine initially. It is believed that this ensures that the reaction of phosgene with the alkali metal salt solution of the aromatic dihydroxy compounds to give the desired oligocarbonates with chlorocarbonic acid ester end groups, occurs.

However, this is only the case if an OH concentration of between about 0.01 and 0.10% by weight, based on the aqueous phase, is maintained, and if the dwell times are less than about 5 minutes, preferably less than about 3 minutes.

Higher OH concentrations pH values) lead to chain stopping as a result of the formation of OH end groups, while at longer dwell times dissociation reactions of the already formed carbonate structures occur. It is only the conjunction of the dwell times, the presence of catalyst during phosgenation, the phosgenation at one OH concentration and the condensation at a higher OH concentration which makes it possible to prepare high molecular polycarbonates of technically high quality.

It is a further advantage of the process according to the invention compared to the conventional process — which is carried out at room temperature using solvents which are able to dissolve polycarbonates — that substantially higher polycarbonate concentrations in the solvent phase can be selected. The upper limit is a solids concentration of about 30% by weight.

This is a decisive economic advantage. It permits better utilization of the parts of the apparatus required for working up the polycarbonates, such as washing installations, pre-evaporator stages and residual solvent evaporator stages, and it allows evaporation of the solvent with substantially less energy. Additional advantages are gained, particularly with regard to the extraction process, which is also carried out at temperatures in excess of about 80°C, since in addition to requiring less wash solution, substantially shorter extraction times are needed.

Compared to the conventional procedure, in which the phosgenation takes place with cooling to remove the heat of reaction from the reaction of the alkali metal salt solution of the aromatic dihydroxy compounds with phosgene, the heat of formation of the polycarbonate is utilized, in the present process, for heating the system to about 70°–90°C.

In principle, the process according to the invention can be carried out in two-stage reactors which ensure good mixing of the reaction phases by employing special devices. In the first reactor, the alkali metal salt solution of the aromatic dihydroxy compounds, optionally together with mono-functional phenols as chain stoppers and/or polyfunctional phenols as chain-branching agents, phosgene, optionally together with the solvent, the catalyst and an additional amount of alkali metal hydroxide to maintain the requisite OH concentration are introduced continuously. After an average dwell time of less than about 5 minutes, the reaction mixture is transferred to the second reaction stage in which a further amount of alkali metal hydroxide solution is introduced to increase the OH concentration.

Figure 2:
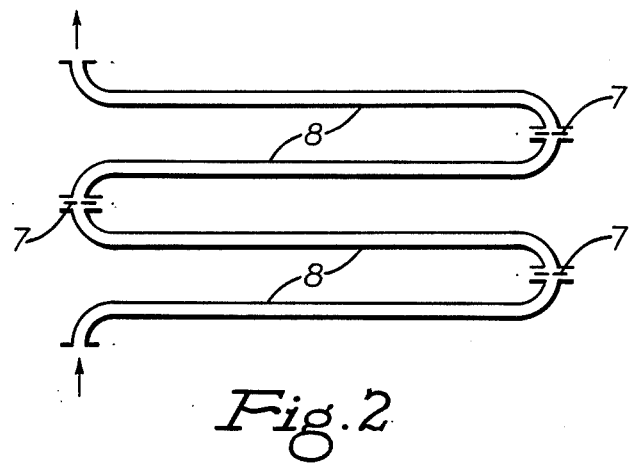

For the second reaction stage, dwell times of in excess of about 1 minute, about 1–3 minutes, suffice if the reaction is carried out in a reaction tube according to U.S. Pat. No. 3,674,740. Longer dwell time (for example in stirred kettle cascades) of approximately 20 minutes, can be maintained without disadvantages. The working up of the reaction solution issuing from the second reactor is then effected in accordance with conventional and known processes. Evaporation in screw equipment is preferred for isolating the product from the process solvent. A preferred embodiment of the present invention involves the use of the reactors illustrated in the accompanying drawing which:

FIG. 1 is a schematic diagram of a circulating reactor for use in the first stage of the process, and FIG. 2 is a schematic diagram of a tube reactor for use in the second stage of the process. The circulating reactor comprises a pipe loop having a conveyor pump 1 (for example, a centrifugal pump operating at 1450 revolutions per minute), inlet pipes 3,4 and 5 for the reactants and an overflow 2 for the reaction solution. The reactants are introduced in the direction of the flow, before the conveyor pump, in the sequence; first, the alkali metal salt solution of the aromatic dihydroxy compound(s) (inlet 3), then the phosgene/solvent mixture (inlet 4) and finally the additional alkali metal hydroxide solution (inlet 5). The minimum interval between successive introductions should be 1 second's dwell time. The volume of the reactor is conveniently 4.25 1 or 5.7 1. The temperature is measured at point 6.

The second reactor consists, in principle, of at least three mixing zones and three dwell zones. The mixing elements 7 shown in FIG. 2 are diaphragms and the dwell zones are NW25 dwell tubes 8. A piston pump (not shown) may be used as a feed device. The dwell time in this system is determined by the size and number of the dwell zones: a convenient total length is 24.6 m with a total volume of 12.1 1. The apparatus is described in U.S. Pat. No. 3,674,740.

Using this combination, the requisite low dwell time in the first and second stage and a very narrow dwell time distribution can be achieved. This produces polycarbonates with a slight molecular weight distribution.

The process according to the invention is suitable for the production of polycarbonates having, in principle, any desired molecular weight Mn, such as, for example, polycarbonates with molecular weight Mn of between 5,000 and 100,000.

Aromatic dihydroxy compounds which can be converted into high molecular polycarbonates in accordance with the process described are those which form water-soluble alkali metal salts with alkali metal hydroxides such as, for example, lithium hydroxide, sodium hydroxide or potassium hydroxide. Among these dihydroxydiarylalkanes of the general formula 1

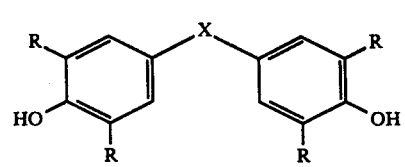

1 wherein x = $C_1$-$C_6$-alkylene, $C_2$-$C_6$-alkylidene, $C_5$-$C_{15}$ - cycloalkylene, $C_5$-$C_{15}$-cycloalkylidine or

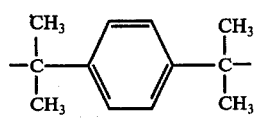

and

R = hydrogen, chlorine, bromine or $C_1$-$C_4$-alkyl such as for example, bis-(4-hydroxyphenyl)-propane-2,2 (bisphenol A), bis-(3,5-dichloro-4-hydroxyphenyl)-propane-2,2(tetrachlorobispenol A), bis-(3,5-dibromo-4-hydroxyphenyl)-propane-2,2tetrabromobisphenol A), bis-(3,5-dimethyl-4-hydroxyphenyl)-propane-2,2 (tetramethylbisphenol A), bis-(4-hydroxyphenyl)-cyclohexane-1,1-(bisphenol Z) and bis-(4-hydroxyphenyl)-p-diisopropylbenzene (trinuclear bisphenol A) are used preferentially.

Chlorinated aromatic hydrocarbons are employed as solvents. Chlorobenzene, dichlorobenzene and trichlorobenzene, o-, m-, and p-chlorotoluene and the known positional isomers of the chloroxylenes should be mentioned. All these solvents are insoluble in water and are good solvents for polycarbonates at elevated temperatures, while at room temperature they dissolve polycarbonates only very slightly, or swell them. In principle, therefore, other solvents possessing analogous solution characteristics, are also suitable. However, they are not used in practice, because they are insufficiently cheap or their chemical resistance is low, especially at the higher temperatures which occur in the evaporation stage. From these points of view, chlorobenzene is the most suitable solvent.

Among the large number of polycondensation catalysts which have been described for the phase boundary process, the trialkylamines are distinguished by being particularly active. This applies preferentially to the first stage of the process described. Triethylamine, triisobutylamine and tri-n-butylamine may be mentioned as examples.

The polycarbonates produced in accordance with the process of the invention are used as moldings and films in the electrical industry. Because of their excellent color quality, they find special use in the optical field and for polycarbonate sheets used as glazing materials.

EXAMPLE 1

The following solutions were pumped into a circulating reactor of 4.25 l reaction volume, as shown in FIG. 1:

1. 91.2 kg/hour of an alkali metal salt solution of bisphenol A, of the following composition: 130 kg of bisphenol A, 631 kg of water, 103.2 kg of 45% strength sodium hydroxide solution, 0.05 kg of sodium borohydride, 2.3kg of p-tert.-butylphenol and 0.575 kg of triethylamine.

2. 6.7 kg/hour of phosgene with 88 kg/hr of chlorobenzene, and 3. 0.5 kg/hour of 45% strength sodium hydroxide solution.

The reaction temperature is 72°C; the concentration of the $OH^-$ ions in the aqueous reaction phase is 0.08%. The average dwell time is 1.4 minutes.

The oligocarbonate shows the following analytical data: Relative viscosity (0.5% strength in methylene chloride) 1.069

| | |
|---|---|
| Saponifiable chlorine [%] (end groups) | 1.4 |
| —OH [%] (end groups) | 0.42 |
| p-tert.-butylphenol [%] (end groups) | 1.52 |

Further sodium hydroxide solution is introduced into the emulsion issuing from the circulating reactor, so as to increase the $OH^-$ ion concentration to 0.30–0.35%. The further condensation of the oligocarbonate is carried out in a reaction tube, as shown in FIG. 2 and described in U.S. Pat. No. 3,674,740 hereby incorporated by reference in its entirety. The average dwell time is 4 minutes; the temperature is 83°C.

The aqueous reaction phase contains 0.32% of $OH^-$ and 0.51% of $CO_3^{--}$; bisphenol is not detectable.

The polycarbonate solution, the solids content of which is 15.1%, is washed free of electrolyte in accordance with known processes, concentrated by evaporation and discharged via an evaporation extruder.

The isolated polycarbonate gives the following data: Relative viscosity (0.5% strength in methylene chloride) 1,304

| | |
|---|---|
| Saponifiable chlorine [ppm] | <2 |
| —OH [%] | <0.01 |
| p-tert.-butylphenol [%] | 1.57 |
| Inorganic chlorine [ppm] | <2 |
| $M_n$ | 19,100 |
| $M_w$ | 32,200 |
| $U^{++)}$ | 0.69 |
| Color index[+)] | 0.05 |

[+)]The polycarbonate color index is an empirical relative figure. This is to be defined in the sense that 0.05 units give a visually detectable gradation for a 4 mm thick test bar viewed in transmitted light.

[++)]U = heterogeneity index $U = \frac{M_w}{M_n} - 1$

EXAMPLE 2

The following solutions are fed into the circulating reactor mentioned in Example 1:

1. 121.7 kg/hour of an alkali metal salt solution of bisphenol A having the same composition as in Example 1.

2. 8.95 kg/hour of phosgene with 62 kg/hour of chlorobenzene and 3. 0.65 kg/hour of 45% strength sodium hydroxide solution.

The reaction temperature is 75°C; the concentration of the $OH^-$ ions in the aqueous reaction phase is 0.04%. The average dwell time is 1.4 minutes.

The oligocarbonate is characterized by the following analytical data:

| | |
|---|---|
| Relative viscosity (0.5% strength in methylene chloride) | 1.065 |
| Saponifiable chlorine [%] (end groups) | 1.45 |
| —OH [%] (end groups) | 0.47 |
| p-tert.-butylphenol [%] (end groups) | 1.45 |

Further sodium hydroxide solution is introduced into the emulsion issuing from the circulating reactor, so as to increase the $OH^-$ ion concentration to 0.30–0.35%. The further condensation of the oligocarbonate is carried out in a reaction tube as specified in Example 1. The average dwell time is 3.9 minutes; the temperature is 85°C.

The aqueous reaction phase contains 0.35% of OH⁻ and 0.53% of CO₃⁻⁻. A test for bisphenol is negative.

The solids content of the polycarbonate solution is 25.3%. The working up of the polycarbonate solution and isolation of the polycarbonate are carried out as described in Example 1.

The analytical data of the polycarbonate are:

| | |
|---|---|
| Relative viscosity (0.5% strength in methylene chloride) | 1.312 |
| Saponifiable chlorine [ppm] | <2 |
| —OH [%] | 0.017 |
| p-tert.-butylphenol [%] | 1.51 |
| Inorganic chlorine [ppm] | <2 |
| $M_n$ | 18,500 |
| $M_w$ | 33,700 |
| Color index | 0.1 |
| U | 0.82 |

EXAMPLE 3

The following solutions are pumped into a circulating reactor of 5.7 l reaction volume: 1. 91.2 kg/hour of an alkali metal salt solution of bisphenol A, of the following composition: 130 kg of bisphenol A, 631 kg of water, 103.2 kg of 45% strength sodium hydroxide solution, 0.05 kg of sodium borohydride, 0.358 kg of 1,4-bis-[4′,4″-dihydroxy-triphenyl)-methyl]-benzene (heptanuclear tetraphenol), 1,970 kg of p-tert.-butylphenol and 0.575 kg of triethylamine.

2. 6.9 kg/hour of phosgene with 64 kg/hour of chlorobenzene and 3. 0.55 kg/hour of 45% strength sodium hydroxide solution.

The reaction temperature is 74°C; the concentration of the OH⁻ ions in the aqueous reaction phase is 0.04%. The average dwell time is 2.2 minutes.

To increase the OH⁻ ion concentration to 0.25–0.30%, further sodium hydroxide solution is introduced into the emulsion before the further condensation of the oligocarbonate in the reaction tube. The reaction temperature is 84°C; the average dwell time is 46 minutes.

The aqueous reaction phase contains 0.27% of OH⁻ and 0.62% of CO₃⁻. Bisphenol is not detectable.

The polycarbonate is isolated from the solution, which contains 19.7% of solids, as in Example 1.

The polycarbonate shows the following data:

| | |
|---|---|
| Relative viscosity (0.5% strength in methylene chloride) | 1.320 |
| Saponifiable chlorine [ppm] | <2 |
| —OH [%] | 0.05 |
| Inorganic chlorine [ppm] | <2 |

EXAMPLE 4

The following solutions are pumped into a circulating reactor of 5.7 l reaction volume;

1. 95.2 kg/hour of an alkali metal salt solution of bisphenol A and bisphenol Z, of the following composition: 55.8 kg of bisphenol A, 28.2 kg of bisphenol Z, 686 kg of water, 63.1 kg of 45% strength sodium hydroxide solution, 0.06 kg of sodium borohydride, 1.45 kg of p-tert.-butylphenol and 0.177 kg of triethylamine.

2. 4.75 kg/hour of phosgene with 52 kg/hour of chlorobenzene and 3. 0.4 kg/hour of 45% strength sodium hydroxide solution.

The reaction temperature is 78°C; the concentration of the OH⁻ ions in the aqueous reaction phase is 0.05%. The average dwell time is 2.4 minutes.

Before further condensation of the oligocarbonate in the reaction tube, sufficient sodium hydroxide solution is introduced into the emulsion that the OH⁻ ion concentration in the aqueous phase is 0.20–0.25%. Furthermore, 0.02 kg/hour of triethylamine are added. The temperature is raised to 80°–85°C in the post-reactor. The average dwell time is 4.9 minutes.

The aqueous reaction phase contains 0.22% of OH⁻ and 0.51% of CO₃≠⁻⁻; the test for bisphenol is negative.

The polycarbonate solution contains 17.5% of solids. The product is isolated in accordance with the customary process.

The polycarbonate is characterized by the following analytical data:

| | |
|---|---|
| Relative viscosity (0.5% strength in methylene chloride) | 1.210 |
| Saponifiable chlorine [ppm] | 13 |
| —OH [%] | 0.04 |
| Inorganic chlorine [ppm] | <2 |

EXAMPLE 5

The following solutions are pumped into a circulating reactor of 4.25 l reaction volume:

1. 132.1 kg/hour of an alkali metal salt solution of tetrabromobisphenol A, of the following composition: 108.8 kg of tetrabromobisphenol A, 629 kg of water, 41.3 kg of 45% strength sodium hydroxide solution, 20.75 kg of 2,4,6-tribromophenol, 0.06 kg of sodium borohydride and 0.505 kg of triethylamine.

2. 5.9 kg/hour of phosgene with 89 kg/hour of chlorobenzene and 3. 1.6 kg/hour of 455 strength sodium hydroxide solution.

The reaction temperature is 76°C; the average dwell time is 1.2 minutes; the OH⁻ ion concentration is 0.04%.

Before entering the reaction tube, 1.8 kg/hour of triethylamine, and further sodium hydroxide solution to raise the OH⁻ ion concentration to 0.25–0.30%, are introduced into the emulsion. The reaction temperature is 84°C; the average dwell time is 3.4 minutes.

The aqueous reaction phase contains 0.27% of OH⁻ and 0.62% of CO₃⁻⁻; the test for bisphenol is negative.

The tetrabromobisphenol polycarbonate is isolated from the solution, which contains 20.5% of solids, by evaporation.

The polycarbonate has the following analytical data:

| | |
|---|---|
| Relative viscosity (0.5% strength in methylene chloride) | 1.047 |
| Saponifiable chlorine [ppm] | 12 |
| —OH [%] | <0.005 |
| Inorganic chlorine [ppm] | <2 |

Comparison

The following solutions are pumped into a circulating reactor, of 23.5 l reaction volume, fitted with heat exchanges for removing the enthalpy of reaction:

1. 91.2 kg/hour of an alkali metal salt solution of bisphenol A, of the following composition: 130.0 kg of bisphenol A, 631.0 kg of water, 103.2 kg of 45% strength sodium hydroxide solution, 0.05 kg of sodium borohydride and 2.7 kg of p-tert.-butylphenol.

2. 7.15 kg/hour of phosgene with 92 kg/hour of a solvent consisting of 60 parts by weight of methylene chloride and 40% by weight of chlorobenzene and 3. 4.3 kg/hour of 45 % strength sodium hydroxide solution.

The reaction temperature is 24°C; the pH value of the aqueous reaction phase is 13.5 and the average dwell time is 8.4 minutes.

The emulsion issuing from the circulating reactor, and containing the oligocarbonate, is mixed with further sodium hydroxide solution, to increase or maintain the pH value of 13.5-14, and with 3.0 kg/hour of a 1% strength aqueous triethylamine solution, and the mixture is pumped through a reaction tube, as described in U.S. Pat. No. 3,674,740 to effect further condensation.

The aqueous reaction phase contains 0.28% of OH$^-$, 0.78% of $CO_3^{--}$ and traces of bisphenol (<0.05%).

The polycarbonate is isolated in accordance with customary processes from the solution which contains 14.6% of solids.

The polycarbonate shows the following analytical data:

| | |
|---|---|
| Relative viscosity (0.5% strength in methylene chloride | 1.296 |
| Saponifiable chlorine [ppm] | <2 |
| —OH [%] | 0.01 |
| p-tert.-butylphenol [%] | <1.85 |
| Inorganic chlorine [ppm] | <2 |
| $M_n$ | 16,000 |
| $M_w$ | 30,400 |
| U | 0.87 |
| Color index | 0.3 |

This comparison example which typifies conventional polycarbonate production by the phase boundary process clearly demonstrates that the process of the present invention produces polycarbonates of comparable quality of those prepared by the conventional process. It is noted that the process of the present invention produces polycarbonates which have an improved color index.

Although the invention has been described in detail in the foregoing for the purpose of illustration, it is to be understood that such detail is solely for that purpose and that variations can be made therein by those skilled in the art without departing from the spirit and scope of the invention except as it may be illustrated by the claims.

What is claimed is:

1. A process for the preparation of a polycarbonate by the phase boundary condensation method, by phosgenation of an aqueous alkali metal salt solution of one or more aromatic dihydroxy compounds, in which the process an aromatic chlorinated hydrocarbon is used as the solvent and the synthesis of the polycarbonate is carried out in two stages, in the first stage of which the reaction of the alkali metal salt solution of the aromatic dihydroxy compoumd(s) with phosgene is carried out at an OH concentration of between 0.01 and 0.1% by weight of OH, relative to the aqueous phase, in the presence of 0.1 to 2.5 mol% of trialkylamine, relative to aromatic dihydroxy compound(s), and at a temperature higher than about 70°C, with a dwell time of less than about 5 minutes, while in a second stage the polycondensation is effected by adjusting the OH concentration to about 0.20 to 0.50% by weight of OH, relative to the aqueous phase, optionally with further addition of trialkylamine, at a temperature higher than about 80°C with a dwell time of more than about 1 minute.

2. A process according to claim 1, in which chlorobenzene is used as the solvent.

3. A process according to claim 1 in which the aromatic dihydroxy compounds are selected from dihydroxydiarylalkalnes of the general formula

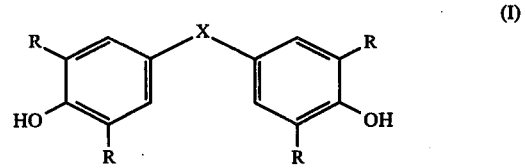

in which
X is $C_1$-$C_6$ alkylene, $C_2$-$C_6$ alkylidene, $C_5$-$C_{15}$ cycloalkylene, $C_5$-$C_{15}$ cycloalkylidene or

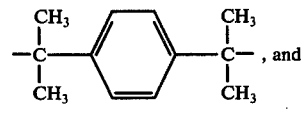

R is hydrogen, chlorine, bromine or $C_1$-$C_4$ alkyl.

4. A process according to claim 3, in which the aromatic dihydroxy compounds are selected from the group consisting of bisphenol A, tetrachlorobisphenol A, tetrabromobisphenol A, tetramethylbisphenol A, bisphenol Z, trinuclear bisphenol A and mixtures of these dihydroxy compounds.

5. A process according to claim 4 wherein chlorobenzene is used as the solvent, the trialkylamine is selected from the group consisting of triethylamine, triisobutylamine, tri-n-butylamine and mixtures of these catalysts and the dwell time in the first stage is less than about 3 minutes.

6. A process according to claim 5 wherein the alkali metal salt is selected from the group consisting of lithium hydroxide, sodium hydroxide, potassium hydroxide and mixtures of these hydroxides.

7. A process according to claim 6 wherein the phosgenation is carried out in a circulating reactor comprising a pipe loop with conveyor pump and inlet pipes for the reactants and an overflow for the reaction solution and the polycondensation reaction is carried out in a tube reactor comprising an alternating sequence of at least three mixing zones and at least three dwell zones.

8. A process according to claim 1 in which the alkali metal salt is selected from the group consisting of llithium hydroxide, sodium hydroxide, potassium hydroxide and mixtures of these hydroxides.

9. A process according to claim 1 in which the trialkylamine is selected from the group consisting of triethylamine, triisobutylamine, tri-n-butylamine and mixtures of these catalysts.

10. A process according to claim 1 in which the dwell time in the said first stage is less then 3 minutes.

11. A process according to claim 1 in which 1.05 to 1.20 mols of phosgene are employed per mol of aromatic dihydroxy compound.

12. A process according to claim 1 in which the phosgenation is carried out in a circulating reactor comprising a pipe loop with conveyor pump and inlet pipes for the reactants and an overflow for the reaction solution and the polycondensation reaction is carried out in a tube reactor comprising an alternating sequence of at least three mixing zones and at least three dwell zones.

13. A polycarbonate prepared by the process of claim 1.

* * * * *